US006272461B1

(12) United States Patent
Meredith et al.

(10) Patent No.: US 6,272,461 B1
(45) Date of Patent: Aug. 7, 2001

(54) METHOD AND APPARATUS FOR AN ENHANCED PRESENTATION AID

(75) Inventors: Phillip C. Meredith, Palo Alto; Christoph A. Aktas, Sunnyvale, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/274,201

(22) Filed: Mar. 22, 1999

(51) Int. Cl.[7] .................................................... G10L 15/00
(52) U.S. Cl. .......................... 704/235; 704/246; 704/278
(58) Field of Search .................................... 704/278, 275, 704/276, 235, 251, 246

(56) References Cited

U.S. PATENT DOCUMENTS

| | | | | |
|---|---|---|---|---|
| 4,931,950 | * | 6/1990 | Isle et al. | 706/11 |
| 5,136,655 | * | 8/1992 | Bronson | 704/270 |
| 5,475,798 | * | 12/1995 | Handlos | 704/277 |
| 5,606,344 | * | 2/1997 | Blaskey et al. | 345/115 |
| 5,649,060 | | 7/1997 | Ellozy et al. | 395/2.87 |
| 5,794,249 | | 8/1998 | Orsolini et al. | 707/104 |
| 5,884,256 | * | 3/1999 | Bennett et al. | 704/235 |
| 6,064,961 | * | 5/2000 | Hanson | 704/260 |

OTHER PUBLICATIONS

Cohen et al. "eye tracker system for use with head mounted displays" pp. 4348–4352, 1998.*

* cited by examiner

*Primary Examiner*—Richemond Dorvil
*Assistant Examiner*—Daniel Abebe

(57) ABSTRACT

A method and an apparatus for providing visual aid to a presenter involve converting the spoken words of a presenter into an electronic text format, electronically comparing the converted spoken words to electronically stored reference text to find text string matches, utilizing the text string matches between the converted spoken words and the reference text to determine a current location of the presentation with respect to the reference text, and delivering upcoming portions of the reference text to the presenter as needed to enable a continuous presentation by the presenter. A preferred presentation support system is incorporated into a portable personal computer that includes a speech recognition subsystem. The speech recognition subsystems allows a presentation to be tracked in real-time so that presentation support material can be automatically displayed to the presenter in synchronization with the in-progress presentation.

18 Claims, 4 Drawing Sheets

GENERATE REFERENCE TEXT — 70
PRESENT VERBAL INFORMATION TO AN AUDIENCE — 72
CONVERT THE VERBAL INFORMATION INTO AN ELECTRONIC VERSION — 74
COMPARE ELECTRONIC VERSION OF THE VERBAL INFORMATION WITH REFERENCE TEXT TO DETERMINE MATCH WITH REFERENCE TEXT — 76
82 — MONITOR THE PACE OF THE PRESENTATION
IDENTIFY A PORTION OF THE REFERENCE TEXT WHICH IS TO BE DISPLAYED TO THE PRESENTER — 78
DISPLAY THE REFERENCE TEXT TO THE PRESENTER — 80

METHOD AND APPARATUS FOR AN ENHANCED PRESENTATION AID

BACKGROUND OF THE INVENTION

The present invention relates to a computer-based presentation support system, and more particularly to a system that provides visual aid to a presenter during the course of a presentation.

DESCRIPTION OF THE RELATED ART

Verbally communicating prepared information to a live audience can be quite challenging. As an alternative to memorizing long speeches and/or detailed information, visual aids are utilized by presenters to guide them through a presentation. Visual aids may include a printed copy of a speech that is held by the presenter, cue cards flipped by a support person, or a teleprompter that is manually paced by a support person. With advances in computer technology, especially desktop and laptop computers, visual aids may also include an electronic copy of a speech that is displayed on a computer screen to a presenter such that the speech can be directly read from the screen by the presenter. In all cases, the presenter or the support person must manually progress through the visual aid by either turning the pages of a printed speech or scrolling through screens of an electronic copy of a speech. Requiring the presenter to manually turn pages or scroll through computer screens may take the presenter's focus away from the content of the presentation or may distract the presenter from connecting with the audience. Moreover, requiring a support person to move through prepared information by flipping cue cards or controlling a teleprompter is costly.

There are known techniques for synchronizing recorded verbal information with prepared textual information, however, the techniques do not provide benefits to a live presenter. An example technique is disclosed in U.S. Pat. No. 5,649,060 entitled "Automatic Indexing and Aligning of Audio and Text Using Speech Recognition," issued to Ellozy et al. (hereinafter Ellozy). Ellozy discloses a computer-based system that synchronizes and indexes recorded verbal information with an electronic transcript of the recorded verbal information. An example application of Ellozy is synchronizing and indexing a transcript of video recorded testimony with the video recording. The system of Ellozy inputs the recorded verbal information into a speech recognizer in order to transform the recorded verbal information into decoded text. The decoded text is then automatically matched with the original electronic transcript via identification of similar words or clusters of words. By matching the decoded text with the original written transcript, an entire written transcript can be indexed with the recorded verbal information, so that a portion of recorded verbal information can be easily located through a text search of the electronic transcript. While Ellozy provides synchronization between recorded spoken words and written text, Ellozy does not disclose a system that is responsive to spoken words in real-time. In addition, while the Ellozy system may be used as a conventional teleprompter, allowing a presenter to read a written transcript from a display screen, the Ellozy system would require manual control of the pace with which the written transcript is scrolled through the teleprompter, thereby providing no benefits over the above-mentioned presentation support techniques.

As a result of the shortcomings of known techniques for providing support to presenters, what is needed is a computer-based technique that has the intelligence to automatically provide visual support to a presenter in a timely manner without physical interaction by the presenter or any other support person.

SUMMARY OF THE INVENTION

A method and an apparatus for providing visual aid to a presenter involve converting the spoken words of a presenter into an electronic text format, electronically comparing the converted spoken words to electronically stored reference text to find text string matches, utilizing the text string matches between the converted spoken words and the reference text to determine a current location of the presentation with respect to the reference text, and delivering upcoming portions of the reference text to the presenter as needed to enable a continuous presentation by the presenter. In a preferred embodiment a presentation support system incorporated into a personal computer includes reference text storage, a speech capture subsystem, a speech recognition subsystem, a comparator subsystem, a processor, a speech pace monitor, and a display. Some of the units in the presentation support system include dedicated equipment, while other units in the presentation support system are associated with standard personal computer equipment.

The reference text storage includes rapidly accessible computer memory for storing reference text. The reference text stored in the memory reflects the prepared information that is to be presented by the presenter. The reference text may be in the form of, for example, a verbatim copy of a speech, an outline of presentation content, or a bullet list of talking points. The reference text may be input into the computer memory through various techniques, including typing the text into a computer-based word processing program.

The speech capture device captures the sounds generated when the presenter speaks and converts the sounds into electronic signals that are representative of the words that are spoken by the presenter. The speech capture device is preferably a microphone system that is incorporated into the personal computer.

The speech recognition system converts the electronic signals from the speech capture device into an electronic text format. The speech recognition system is powered by hardware and software that enable spoken words to be converted into electronic text in real-time, or with negligible delay after the words are spoken by the presenter.

The comparator correlates the converted electronic text to the reference text in order to identify matching text strings between the spoken words and the reference text. The matching text strings may involve a single word, but preferably involve multiple words in order to maximize the likelihood that the spoken words correspond to the appropriate section within the reference text.

The speech pace monitor determines the pace at which the presenter is speaking. The pace of speaking is preferably measured by calculating the number of words per unit of time that are being spoken by the presenter. The pace can be determined by monitoring actual words spoken or monitoring the progression of a presentation through the reference text.

The processor determines the content and timing of information that is to be provided to the presenter. The processor preferably utilizes realtime information concerning the location of the spoken words relative to the reference text to determine which portion of the reference text will be needed by the presenter next. In a most preferred embodiment, the processor also utilizes speech pace information from the speech pace monitor in order to appropriately time the delivery of reference text to the presenter. Determining the content and timing of information that is provided to the presenter is performed by the processor on a continuous basis, such that adjustments to the delivery of reference text can be made throughout a presentation.

The monitor is preferably a conventional computer monitor or screen that enables the reference text to be read by the presenter. The monitor is preferably positioned so that it is viewable by the presenter and not by the audience. By discretely providing reference text only to the presenter, the audience is not distracted from the message of the presenter.

In operation, reference text is prepared and stored in the reference text memory of a personal computer before a presentation is scheduled to begin. With the reference text stored in the personal computer memory, the presentation support system is activated prior to delivery of the desired presentation by the presenter.

Once the presenter begins speaking, the presenter's spoken words are captured by the speech capture subsystem and transformed into electrical signals. The electrical signals are transmitted from the speech capture subsystem to the speech recognition subsystem, where the electronic signals are decoded into their respective words. The speech recognition operation is performed in real-time with respect to the speaking such that spoken words are electronically converted into electronic text format within fractions of a second after being spoken by the presenter.

As spoken words are being recognized by the speech recognition subsystem, the words are being transmitted to the comparator. The comparator searches an electronic copy of the reference text in order to locate text strings which match the decoded spoken words. Once a match is identified between the decoded spoken words and the reference text, the location of the spoken words relative to the reference text is transmitted to the processor.

The processor utilizes the information concerning the location of the spoken words relative to the reference text to identify a portion of the reference text that should be delivered to the presenter as a presentation aid. For example, the processor can be programmed to deliver reference text to the presenter on a paragraph-by-paragraph, line-by-line, or word-by-word basis, depending on the needs of the presenter. In an enhancement to the preferred embodiment, speech pace information delivered from the speech pace monitor is also utilized by the processor to better determine the timing with which the next portion of reference text should be delivered to the presenter. Ideally, the processor utilizes the speech pace information to deliver the next applicable section of reference text to the presenter just as it is needed in order to enable a continuous flowing presentation of the reference text material.

Once the processor determines the content and timing of the delivery of the reference text to the presenter, the reference text is delivered to the presenter through a display screen that is visible to the presenter. The delivery of reference text to the presenter continues as long as there is correspondence between the spoken words and the reference text. When the presenter strays from the reference text, the delivery of reference text to the presenter is paused until the presenter returns to the reference text.

DETAILED DESCRIPTION

Figure 1:
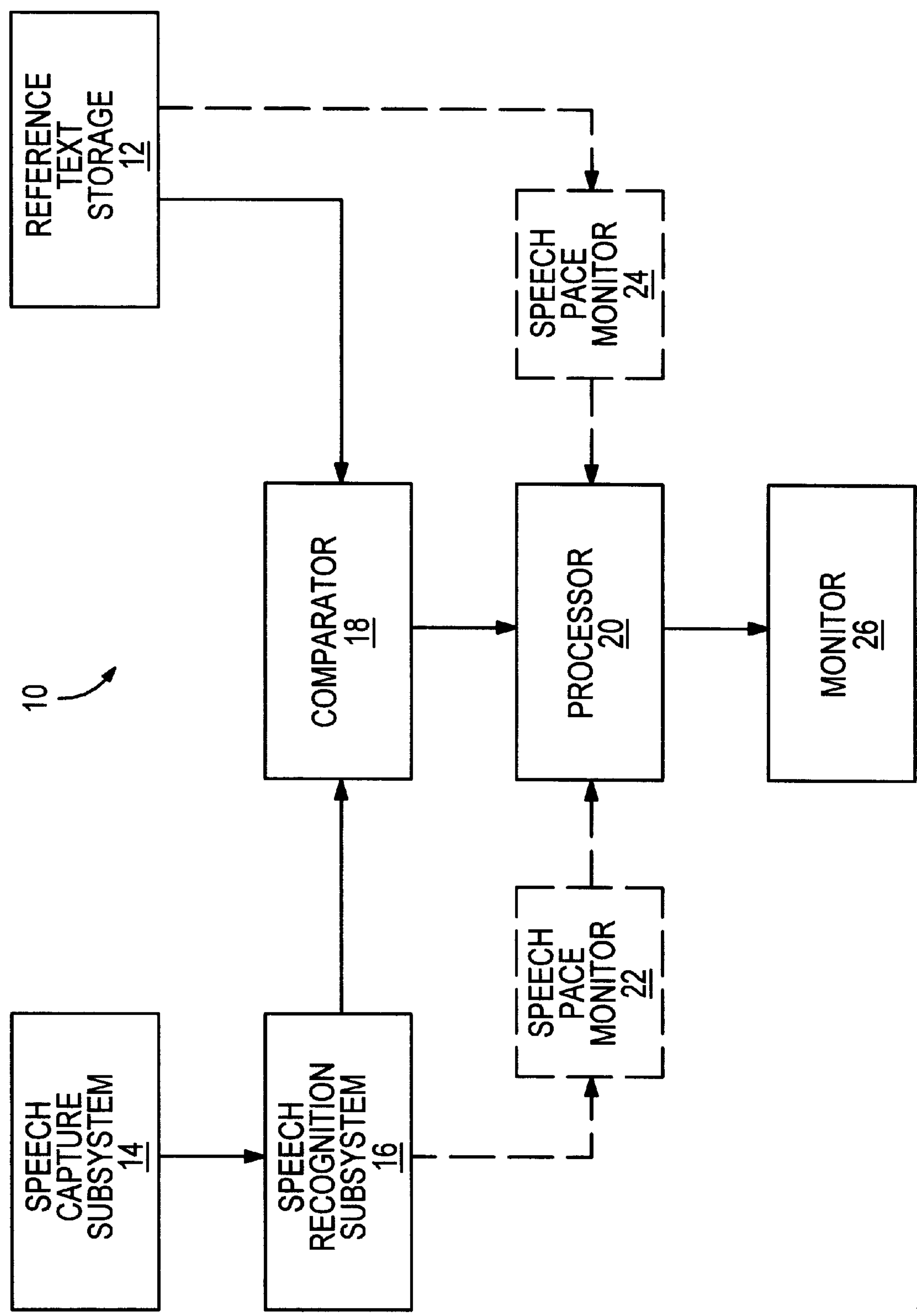
FIG. 1 is a depiction of a preferred presentation support system in accordance with the invention.

The preferred presentation support system is incorporated into a personal computer (PC), such as a portable computer. Referring to FIG. 1, the preferred presentation support system 10 includes reference text storage 12, a speech capture subsystem 14, a speech recognition subsystem 16, a comparator 18, a processor 20, a speech pace monitor 22 and 24, and a display 26. Some of the units in the presentation support system include dedicated equipment, while other units in the presentation support system are associated with standard PC equipment.

The reference text storage 12 includes rapidly accessible computer memory, such as RAM, for storing reference text and/or material other than text. The reference text can be input into the computer memory through various techniques, including typing the text into a computer-based word processor, scanning text into a computer from printed pages, creating text through voice recognition, and/or creating text through handwriting recognition. The reference text reflects the prepared information that is to be presented. The reference text may be in the form of, for example, a verbatim copy of a speech, an outline of presentation content, or a bullet list of talking points. The reference text may include keywords that are specially identified for quick access. In addition, graphics may be included as part of the reference text, with particular graphics being associated with text-based keywords.

The speech capture subsystem 14 captures the sounds generated by the presenter and converts the sounds into electronic signals that are representative of the words that are being spoken by the presenter. The speech capture subsystem is preferably a microphone system that is incorporated into the PC.

The speech recognition subsystem 16 converts the electronic signals from the speech capture subsystem 14 into an electronic text format. The speech recognition subsystem is powered by hardware and software that enable spoken words to be converted into electronic text in real-time, or with negligible delay. Suitable speech recognition subsystems are available from IBM Corporation.

The comparator 18 correlates the converted electronic text from the speech recognition subsystem 16 with the reference text from the reference text storage 12 in order to identify matching text strings between the spoken words and the reference text. The matching text strings may involve a single word or multiple words depending on the application. Preferably the matched text strings include multiple words in order to maximize the likelihood that the spoken words correspond to the appropriate section of reference text. Once an acceptable correspondence between the spoken words and the reference text is determined, the presenter can be supported in various ways which are described below. The comparator is preferably embodied in software that is supported by the PC hardware, however, the comparator may include supplemental hardware.

The speech pace monitor 22 and 24 determines the pace at which the presenter is speaking. The pace of speaking is preferably measured by calculating the number of words per unit of time that are being spoken by the presenter, although other methods are possible. The speech pace can be determined by monitoring actual words spoken (as represented by speech pace monitor 22) or the pace can be determined by monitoring the progression through the reference text (as represented by speech pace monitor 24). The pace can be determined for narrow time ranges within a presentation, or for longer time ranges, depending on specific needs. In some embodiments of the invention, a speech pace monitor may not be utilized and as a result the speech pace monitors are shown with dashed lines.

The processor 20 determines the content and timing of information that is to be provided to the presenter. The processor preferably utilizes the real-time information concerning the location of the spoken words relative to the reference text to determine which portion of the reference text will be needed by the presenter next. In a most preferred embodiment, the processor also utilizes speech pace information from a speech pace monitor 22 or 24 in order to appropriately time the delivery of reference text to the presenter. The processor may also perform functions such as determining the amount of reference text that will be delivered to the presenter. Determining the content and timing of information that is provided to the presenter is performed by the processor on a continuous basis in real-time, such that adjustments to the delivery of reference text can be made throughout a presentation.

The monitor 26 is preferably a conventional computer monitor or screen that enables the reference text to be read by the presenter. During a presentation to an audience, the monitor is preferably positioned so that it is viewable by the presenter, but not by the audience. By discretely providing the reference text only to the presenter, the audience is not distracted from the message of the presenter. In some applications, the presenter's display screen may include information that is being projected onto a large viewing screen for the benefit of the audience. In this case, the presentation support system can be configured to display certain presentation aid material, such as special talking notes, only on the presenter's screen, while the primary presentation aid, such as large-scale bullet items or graphics, are displayed on the large viewing screen for all of the audience to see. The specific material that is viewable only by the presenter is completely programmable through a presentation support system user interface.

Operation of the presentation support system is described with reference to FIG. 1. Initially, reference text is prepared and stored in the reference text memory 12 of a PC before a presentation is scheduled to begin. As described above, the reference text may be, for example, a verbatim copy of a speech. With the reference text stored in the PC memory, the presentation support system 10 is activated prior to delivery of the desired presentation by the presenter. In a preferred application, the presenter is talking directly to a live audience.

Once the presenter begins to speak, the spoken words are captured by the speech capture subsystem 14 and transformed into electrical signals. The electrical signals are transmitted from the speech capture subsystem to the speech recognition subsystem 16, where the electronic signals are decoded into words. In the preferred presentation support system, the speech recognition operation is performed in real-time such that spoken words are electronically converted into electronic text format in less than a second after being spoken by the presenter.

As words are being recognized by the speech recognition subsystem 16, the recognized words are being transmitted to the comparator 18. The comparator searches a copy of the reference text in order to locate text strings that match the decoded spoken words. Once a match is identified between the decoded spoken words and the reference text, the location of the spoken words relative to the reference text is transmitted to the processor 20.

The processor 20 utilizes the information concerning the location of the spoken words relative to the reference text to identify in real-time a portion of the reference text that should be delivered to the presenter as a presentation aid. For example, the processor can be controlled to deliver reference text to the presenter paragraph-by-paragraph, line-by-line, or word-by-word, depending on the needs of the presenter. In an enhancement to the preferred embodiment, speech pace information delivered from a speech pace monitor is also utilized by the processor in order to better determine the timing with which the next portion of reference text should be delivered to the presenter. For example, the processor can utilize the speech pace information to deliver the next applicable section of reference text to the presenter just as it is needed by the presenter.

Once the processor 20 determines the content and timing for the delivery of the reference text to the presenter, the reference text is delivered to the presenter through a display screen on the monitor 26. The delivery of reference text to the presenter preferably continues as long as there is correspondence between the spoken words and the reference text. As a result, a presenter can progress through an entire speech without having to physically contact the PC in any way.

Figure 2:
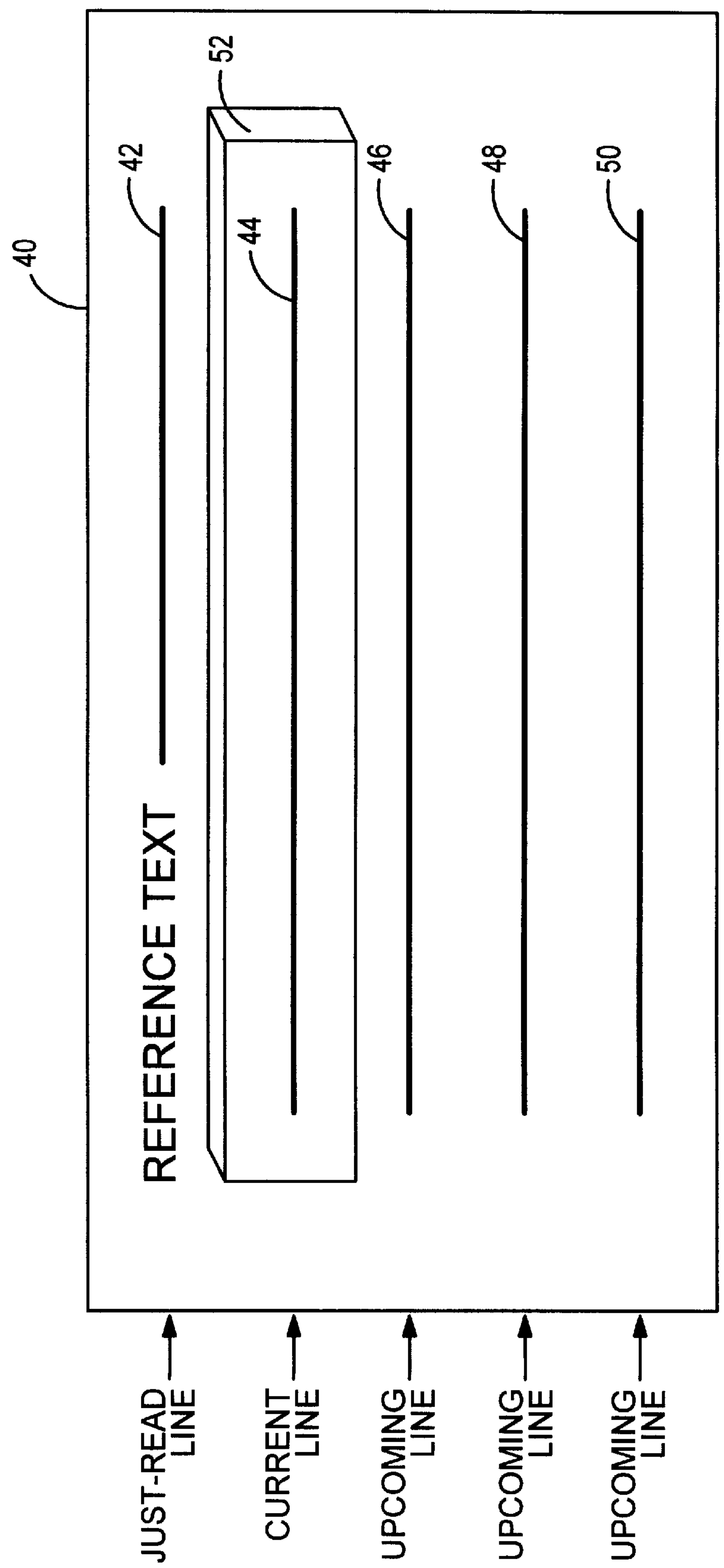
FIG. 2 is a depiction of a display technique for reference text in accordance with the invention.

An example of how information is presented on a display screen for a presenter is shown in FIG. 2. FIG. 2 shows a display screen 40 with five lines 42, 44, 46, 48, and 50 of reference text that are represented by the five horizontal lines. The current line of reference text 44 which is to be read by the presenter is highlighted in an easily recognizable box 52, identified as the "current line." Highlighting the current line enables the presenter to easily locate the current position within the speech. In the example of FIG. 2, the line of text 42 right above the current line of text is a "just-read line." The just-read line of reference text is still displayed on the display screen in case the presenter needs to revisit the line. In addition, three "upcoming lines" of text 46, 48, and 50 are displayed directly below the current line, so that the presenter has an idea of what is coming next. Neither the just-read line nor the upcoming lines is located within the highlighted box. In other embodiments of the invention, the display screen may display only the speech text that is going to be immediately read by the presenter and/or text highlighting may not be used. Although a few examples of displaying text to a presenter are described, there are many alternative arrangements that can be implemented in order to support a presenter during a presentation.

Figure 3:
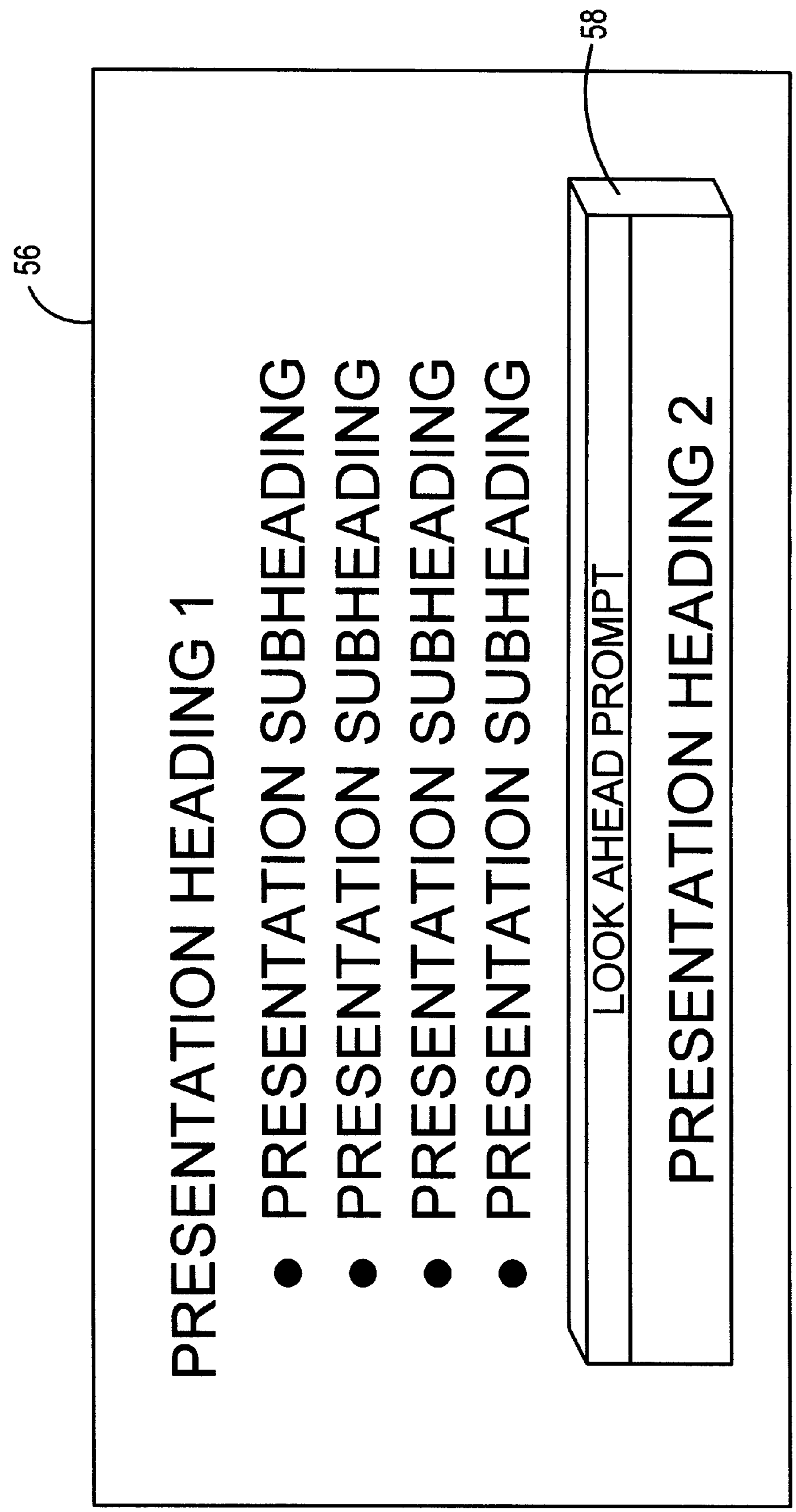
FIG. 3 is a depiction of a display technique for reference text in accordance with the invention.

An example of an alternative display approach is shown in FIG. 3. In the display screen 56 of FIG. 3, the reference text is organized into a bulletized format with presentation headings and presentation subheadings. As shown, a "look ahead prompt" 58 is displayed in a special subwindow in order to identify, to the presenter, the title of the topic which is on the next screen. The look ahead prompt is activated by recognizing matches between spoken words and the reference text as described above. The look ahead prompt works well in situations in which all of the material, except the material in the look ahead prompt, is also displayed on a large screen for viewing by the audience. The look ahead prompt is provided only to the computer screen of the presenter, so that the audience is not distracted by upcoming material, yet the presenter is alerted as to what is coming up next. Look ahead prompts can alternatively be configured to identify other reference text to the presenter, such as speaking notes for the subheadings, with the speaking notes being visible to the presenter but not to the audience. Other techniques of highlighting and/or identifying presentation material are also possible.

The presentation support system may include various additional features. One enhancement feature of the support system is the ability to pause the delivery of new reference text to the presenter when the presenter strays from the reference text. Because the comparator continuously searches the reference text for matching text strings, it can be determined when the presenter has deviated from the reference text. During the time when the presenter has deviated from the reference text, the delivery of reference text to the monitor is paused or held static. The system is programmed to continue delivering reference text to the monitor once the comparator begins to find sufficient correlation between the spoken words and the reference text. Matching thresholds can be developed and adjusted such that reference text delivery occurs only when the desired level of correspondence is found.

Another enhancement feature of the presentation support system is keyword resynchronization. Keyword resynchronization involves designating certain words within the reference text as keywords and then speaking the keywords into the speech capture system in order to locate a particular section of the reference text. For example, when the presenter strays from the reference text, a keyword can be spoken by the presenter to resynchronize the reference text back to a particular point in the presentation without requiring the presenter to flip pages or scroll through a computer screen. The keyword feature can be applied to specific situations, such as a presenter answering questions from the audience. For example, a question asked by the audience can be restated by the presenter into the speech capture system in order to trigger help from the support system. Specifically, keywords of a question can be linked to specific response material within the reference text. The question and answer feature is especially applicable to call centers where service representatives are responding to questions from customers. Providing response material to call center representatives enables faster training of call center representatives and insures that accurate information is provided to the customers.

Another enhancement feature of the presentation support system is the ability to deliver reference text to selected audience members. For example, there may be situations in which certain audience members, such as the hearing impaired, may desire to have the reference text delivered to their computers. This application can be applied in a presentation hall where audience members have access to networked computers. Or, the application can be applied to network or web-based interactions in which multimedia presentations are being electronically conducted between network connected parties.

Yet another enhancement feature of the presentation support system is the ability to bypass certain material in the reference text when that material is not needed in the presentation. For example, the presenter may have certain portions of information within the reference text that will be presented to an audience in some situations and left out in other situations. During the real-time comparison of the spoken words to the reference text, the presentation support system can determine whether or not the optional material is being included or excluded from the presentation and can adjust the delivery of reference text to the presenter appropriately.

Although the preferred embodiment is primarily described with reference to live and in-person presentations, the presentation support system is also applicable to network or web-based interactions. For example, a multimedia web-based interaction may involve the exchange of voice and data content. In a network or web-based interaction the presenter's spoken words are decoded and reference text is delivered to the presenter as a visual aid. Reference text can be delivered to the audience of the network or web-based interaction as need to support the interaction. The presentation support system is also applicable to telecommunications applications between a presenter and an audience, such as call center interactions and teleconferencing.

Figure 4:
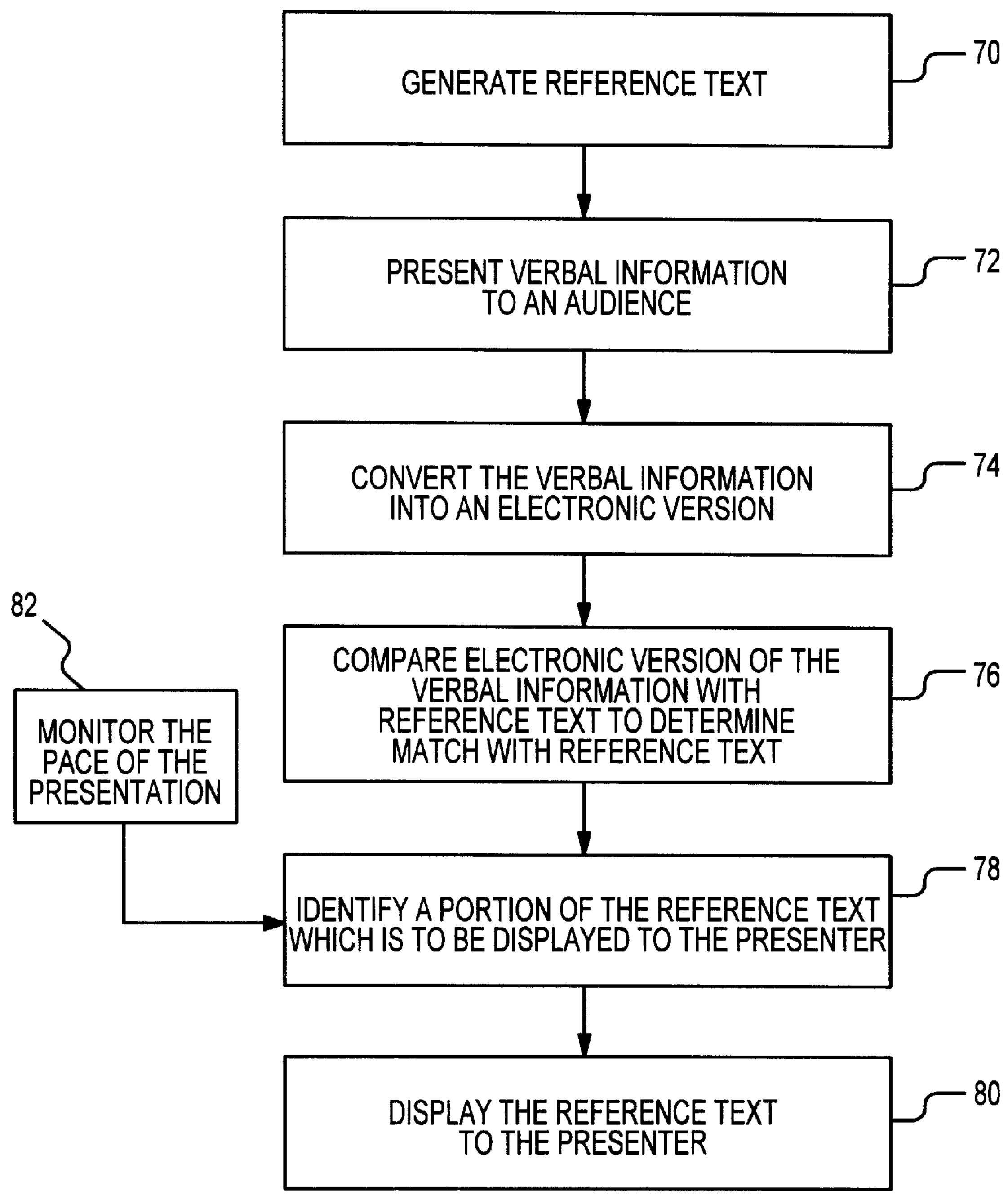
FIG. 4 is a process flow diagram of a preferred method for providing a presentation aid to a presenter.

FIG. 4 is a process flow diagram of a preferred method of providing visual aid to a presenter that is presenting information to an audience. In a step 70, an electronic version of reference text, that represents information that will be presented to an audience by a presenter, is generated. In a step 72, verbal information is presented to the audience, with the verbal information being related to the reference text. In a step 74, the verbal information is converted into an electronic version. In a step 76, the electronic version of the verbal information is compared to the electronic version of the reference material to locate a text string within the reference material that coincides with the presented verbal information. In a step 78, the located text string is utilized to identify a portion of the reference material. In a step 80, the identified portion of the reference material is displayed to the presenter. In an enhanced process step 82, the pace of the presentation of verbal information by the presenter is monitored and speech pace information is utilized to identify the portion of the reference text which is to be displayed to the presenter.

What is claimed:

1. A method of providing visual aid to a presenter of verbal information to an audience comprising steps of:

generating an electronic version of reference material that represents information that will be presented to said audience by said presenter;

monitoring progress of presenting verbal information to said audience, said verbal information being related to said reference material and presented by said presenter;

converting said verbal information into an electronic version;

correlating said electronic version of said verbal information directly to said electronic version of said reference material to locate a text string within said reference material that coincides with said presented verbal information; and displaying a portion of said reference material to said presenter, said portion being based on said located text string.

2. The method of claim 1 wherein said steps of correlating and displaying include identifying said portion of said reference material that is to be presented next to said audience.

3. The method of claim 1 wherein said step of displaying said portion includes looking ahead in said reference material from said located text string and identifying said portion of said reference text that is soon to be presented by said presenter.

4. The method of claim 3 further including a step of pausing said step of displaying when no coinciding text strings are located between said electronic version of said verbal information and said electronic version of said reference material.

5. The method of claim 1 wherein; said step of displaying includes utilizing a computer monitor to display said portion of said reference material.

6. The method of claim 1 further comprising steps of determining a pace at which said verbal information is being presented by said presenter and using said pace to determine a pace at which subsequent portions of said reference material will be displayed to said presenter.

7. The method of claim 6 further including a step of displaying said identified portion of said reference text to said presenter just as said identified portion of said reference text is needed by said presenter for presentation to said audience.

8. The method of claim 1 wherein said steps of converting, correlating, and displaying are performed in real-time with respect to said step of monitoring progress of presenting said verbal information to said audience.

9. The method of claim 1 wherein said step of generating said reference material includes generating text and graphics.

10. The method of claim 1 wherein said step of presenting said verbal information includes a step of addressing said audience while in the presence of said audience.

11. The method of claim 1 wherein said step of presenting said verbal information to said audience includes a step of remotely addressing said audience via a network connection.

12. The method of claim 1 wherein said step of correlating includes a step of transforming said verbal information into electronic text formed of individual words that are representative of said verbal information.

13. A computer-based presentation support system for providing real-time support to a presenter comprising:

means for storing reference text in electronic format;

means for converting into electrical signals a verbal communication made by a presenter to an audience;

means, operatively associated with said converting means, for recognizing words from said electrical signals;

a monitor connected to said recognizing means to determine a monitored pace, said monitor being configured to employ occurrences of recognized words for monitoring a pace at which said verbal communications are made by said presenter;

means, connected to said storing means and said recognizing means, for searching said reference text to identify a text string that coincides with a portion of said recognized words;

means, connected to said searching means, for utilizing said identified text string to select a portion of said reference text that should be communicated to said presenter; and means, connected to said utilizing means, for communicating said selected portion of said reference text to said presenter.

14. The presentation support system of claim 13 wherein said utilizing means receives said monitored pace and selects said portion of said reference text by using said monitored pace to calculate when said selected portion of said reference text will be needed by said presenter.

15. The presentation support system of claim 13 wherein said communicating means is a computer display screen that displays said selected portion of said reference text to said presenter.

16. The presentation support system of claim 13 wherein said converting means, said recognizing means, and said utilizing means function in real-time with respect said verbal communication made by said presenter to said audience such that said presenter is continuously prompted with relevant portions of said reference text.

17. A computer-based method for providing continuous real-time support to a presenter comprising the steps of:

generating an electronic version of reference text that represents information that will be orally presented to an audience by a presenter;

presenting verbal information to said audience, said verbal information being related to said reference text and presented by said presenter;

converting said verbal information into electronic text in real-time with respect to said presentation by said presenter;

determining a pace at which said reference text is being presented by said presenter;

comparing said electronic text of said verbal information to said electronic version of said reference text to locate a text string within said electronic version of said reference text that coincides with said electronic text of said verbal information;

utilizing said located text string and said determined pace to identify a portion of said reference text that is needed next by said presenter in order to maintain a continuous presentation of said verbal information; and displaying said identified portion of said reference text to said presenter so that said presenter can read said identified portion of said reference text and maintain a continuous presentation of said verbal information to said audience.

18. The method of claim 17 further comprising a step of continuously repeating said step of presenting through said step of displaying as said presenter continues to talk such that said presenter is continuously prompted with reference text that is in synchronization with said verbal information.

* * * * *